May 8, 1951 H. P. MIXER 2,552,201

MULTIPLYING MECHANISM

Filed Sept. 27, 1946 7 Sheets-Sheet 1

*INVENTOR.*
HAROLD P. MIXER

BY John L. Sterling

ATTORNEY

INVENTOR.
HAROLD P. MIXER

BY John L. Sterling

ATTORNEY

May 8, 1951 H. P. MIXER 2,552,201

MULTIPLYING MECHANISM

Filed Sept. 27, 1946 7 Sheets-Sheet 3

INVENTOR.
HAROLD P. MIXER

BY [signature]

ATTORNEY

MULTIPLYING MECHANISM

Filed Sept. 27, 1946 7 Sheets-Sheet 4

INVENTOR
HAROLD P. MIXER
BY John L. Sterling
ATTORNEY

May 8, 1951 H. P. MIXER 2,552,201

MULTIPLYING MECHANISM

Filed Sept. 27, 1946 7 Sheets-Sheet 5

INVENTOR.
HAROLD P. MIXER

BY J. L. Sterling

ATTORNEY

INVENTOR
HAROLD P. MIXER
BY J. L. Sterling
ATTORNEY

INVENTOR
HAROLD P. MIXER
BY J. L. Sterling
ATTORNEY

Patented May 8, 1951

2,552,201

UNITED STATES PATENT OFFICE 2,552,201

MULTIPLYING MECHANISM

Harold P. Mixer, Rockville Centre, N. Y., assignor to Remington Rand Inc., New York, N. Y., a corporation of Delaware Application September 27, 1946, Serial No. 699,745

10 Claims. (Cl. 235—61)

My invention relates to computing machines and more particularly to such machines whose operations involve the obtaining and the accumulation, additively or subtractively, of products; and it has for its principal object to provide improved multiplying mechanism for such machines. The invention relates to that class of computing machines that yield a product by true multiplying mechanism as distinguished from that class of machine whose mechanism is essentially that of an adding machine and in which when a number is multiplied by 3, for example, the number is set up and the machine operated 3 times.

The invention has for one of its objects to provide mechanism which yields partial products, that is, the product of a multiplicand by a digit of a multiplier and which transfers said partial product in its entirety to an accumulator by one continuous movement or at least substantially so. The several partial products constituting the whole product of a multiplicand by a plural digit multiplier may be accumulated additively or may be subtracted from a previously accumulated amount as, for example, in the figuring of discounts.

The invention has for further objects to make certain subsidiary improvements in the mechanism.

The invention includes a multiplying logarithmic spiral pair laid off to yield the products of the nine digits by one another covering the range of one to eighty-one and mechanism for controlling the operation of such a pair and for entering the products into an accumulator. According to the invention a series of these pairs and their associate mechanism is provided, one for each denomination or order, and gearing for conveying the movement of each logarithmic pair to a wheel of an accumulator so that as the several pairs are rotated each to yield the product of two digits, the whole product is rolled at once into said accumulator. I am not aware of any prior construction of which this is true. The invention also includes means to add one unit of movement at each operation of a logarithmic pair to compensate for the fact that the operation of such pairs starts at one instead of at zero. Preferably, this additional one is added on the accumulator as a portion or extension of the continuous movement of the logarithmic pair.

To the above and other ends the invention consists of certain features of construction and combinations and arrangements of parts, all of which will be fully described herein and particularly pointed out in the claims.

An instance of the invention is illustrated in the accompanying drawings, in which:

Fig. 7 is a view looking leftward from the line 7—7 of Fig. 8;

Fig. 8 is a front elevation;

Fig. 9 is a view with some parts in section on the line 9—9 of Fig. 8 and looking toward the left;

Figure 17:
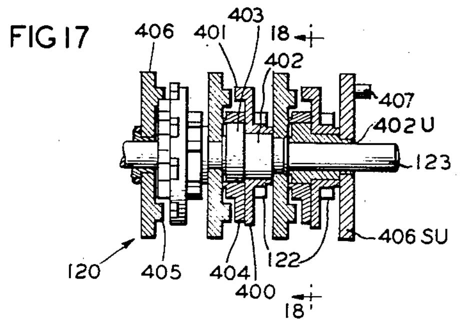
Figure 18:
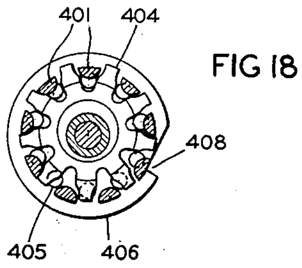

Figs. 13–16, inc., are detached views of operating cams and the levers more immediately operated thereby;

Fig. 17 is a cross section through the accumulator;

Fig. 18 is a cross section taken along line 18—18 of Fig. 17; and

Figure 19:
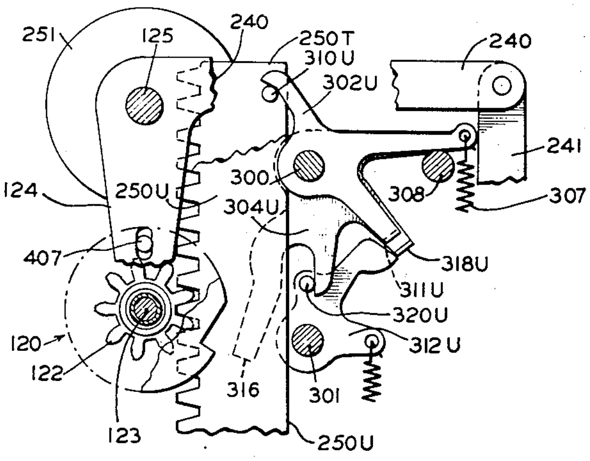
Figure 20:
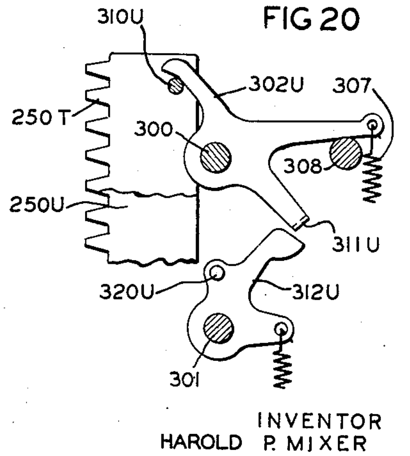
Figure 21:
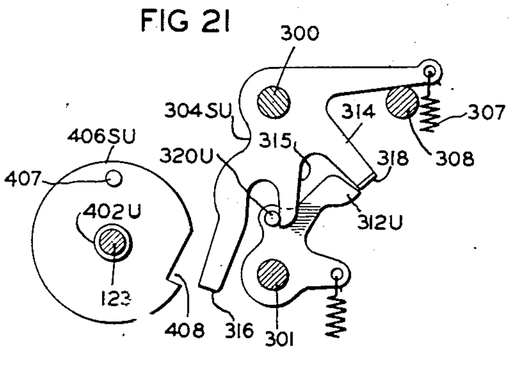

Figs. 19, 20, and 21 show the zeroizing mechanism for the accumulator.

The main frame of the machine shown in the drawings, comprises a base plate 50 (Figs. 1 and 2), a right hand side plate 51, a left hand side plate 52, and certain cross members joining said side plates.

The multiplying elements consist of like pairs of spirals N and L rolling, the one spiral on the other, one pair for each denomination of the multiplicand. The numeral spirals N are journaled on a cross shaft 101 and the logarithm spirals (herein for brevity called the log spirals) on a cross shaft 102. A pair of these spirals is shown diagrammatically in Fig. 10, and in their physical forms in Fig. 11. When the gear L is displaced from its initial position in accordance with a logarithm, the gear N is displaced in accordance with the antilog of that logarithm. When the gear L is displaced in accordance with the sum of the logarithms of two digits, the gear N is displaced in accordance with the product of those digits.

Figure 10:
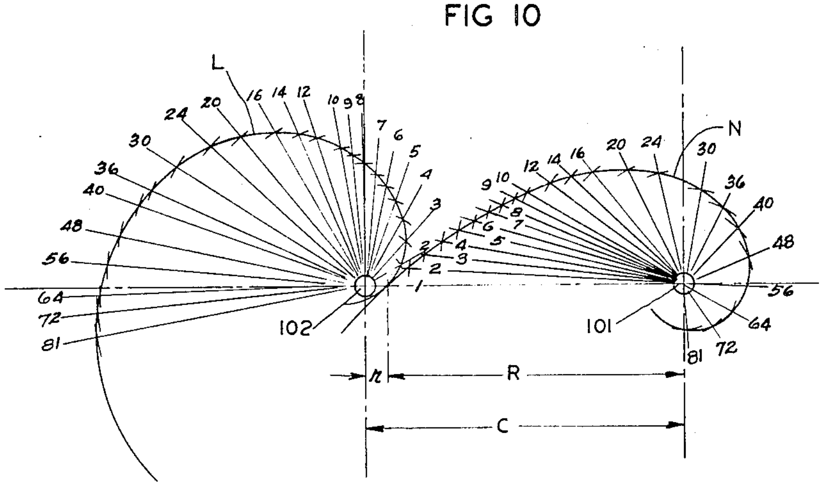
Fig. 10 is a diagram of a spiral pair.
Figure 11:
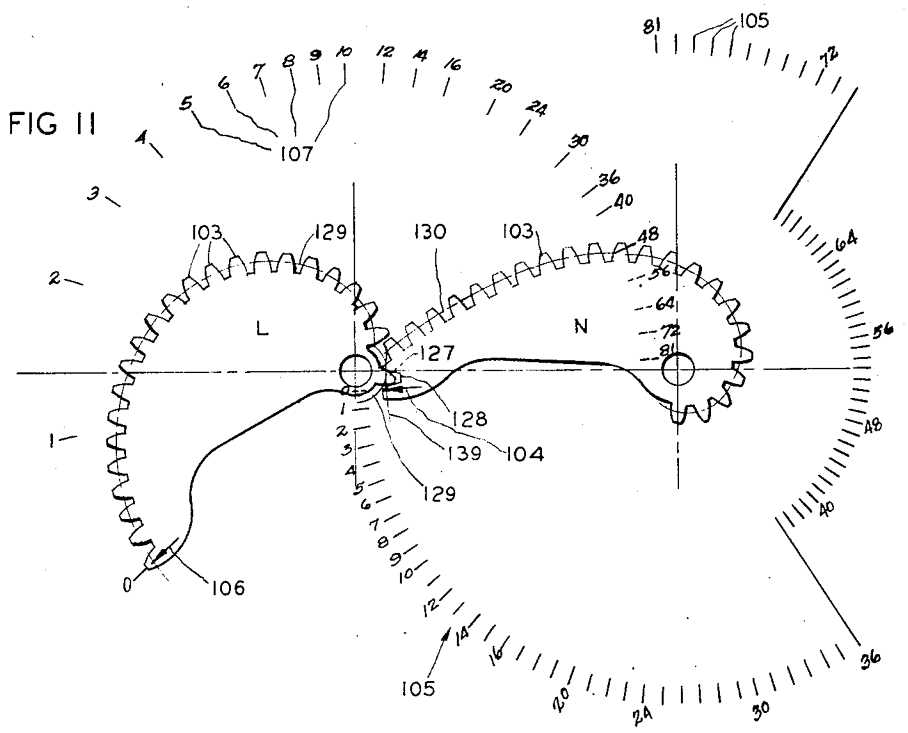
Fig. 11 shows a a pair of spiral gears together with scales illustrating the different numerical positions of said gears.

In Fig. 10 the spirals are shown in their initial position, spiral N being at 1 and L at 0, which is log 1. In Fig. 11, the spirals are shown retracted to a certain zero position which will be explained hereinafter. By turning them one step from their Fig. 11 positions, spiral N counterclockwise and spiral L clockwise, they will be brought to initial logarithmic position where an index 104 on spiral N registers with graduation 1 on a schematically drawn scale 105, and an index 106 on spiral L registers with graduation 1 on a similar logarithmic scale 107. In other words, this movement will bring the spirals to the position shown diagrammatically in Fig. 10. The following discussion will be based on this initial position, the zero position of Fig. 11 being ignored for the present. The indexes and scales are drawn in Fig. 11 for explanatory purposes only. The graduations on the scale 105 are at equal intervals, representing numbers, and those of scale 107 are at unequal intervals appropriate to the respective logarithms of such numbers. If we take the angular interval between two of the graduations of scale 105 as our unit of angular measurement then we may say that to bring spiral N to represent a number $x$, we turn it from its initial "1" position through an angle equal to $x-1$. In such turning, spiral L will turn through an angle $y$ proportional to, but not equal to, log $x$. We may say, therefore, that it is the law of this spiral pair that $$y=a.\log x \qquad (1)$$

where $a$ is a constant.

Spiral pairs of the general type, represented by the equation, are known in calculating machines, and they are capable of performing multiplication and division. For example, such a pair is described in the patent to T. W. Ross, No. 1,503,810, issued August 5, 1924. In that patent the two spirals are connected to roll together by two reverse tapes; but in the present instance I have preferred to make them as "queer" gears having teeth 103, the spiral curves being at the pitch lines. Multiplication and division may be performed with such spirals. If spiral L be turned through an angle equal to $a$.log 8, index 104 will move to 8 on its scale. If now, spiral L be turned through a further angle equal to $a$.log 3, index 104 will point to 24 on its scale. Or, if spiral L be set at $a$.log 48, and then turned counter-clockwise through an angle $a$.log 16, index 104 will come to 3, the quotient of 48 divided by 16. In the said Ross patent, however, the spirals are graduated only from 1 to 10, lower orders of the product being obtained by interpolation, as with a slide rule. According to the present invention the spirals are laid off from 1 to 81, so that, within that range the rotations of a spiral N are directly proportional to the products, less 1.

In Fig. 10, C is the distance between the centers of shafts 101 and 102, R is any radiant of spiral N, and $r$ the corresponding radiant of spiral L. In any position of the spirals, the momentary rate of increase of angle $y$ with respect to angle $x$, is obviously equal to $$\frac{R}{r}$$

Also, said rate of increase is equal to $$\frac{dy}{dx}$$

Differentiating Equation 1, therefore.

$$\frac{R}{r}=\frac{dy}{dx}=a\frac{M}{x} \qquad (2)$$

where M is the modulus of logarithms to the base 10 (.4343).

Obviously, $$C=R+r \qquad (3)$$

Combining Equations 2 and 3, $$R=C\frac{aM}{x+aM} \qquad (4)$$

and $$r=C\frac{x}{x+aM} \qquad (5)$$

According to these equations, R and $r$ are each proportional to C. Varying the latter will, therefore, change the size of the curves, but not their shape. But R and $r$ do not bear this simple relation to $a$, and varying the latter will, therefore, change the shapes of the curves. Obviously, $a$ may be said to be equal to the ratio of the unit of measurement of the angular movement of spiral L to that of spiral N, and therefore, to increase $a$ is to increase the total angle through which the spiral L swings. A little consideration of Equation 4 will show that to increase $a$ will make comparatively little difference in the radiants when $x=1$, but will appreciably increase R, where $x=81$. Also, changing the unit of angle would change proportionately the number of degrees of angle covered by the scales 105 and 107, and the angles through which the spirals turn. Thus, within the purview of the above equations, a number of spiral pairs may be worked out differing more or less from one another, and the choice of one of them as the most desirable will probably be based on mechanical considerations which may be better understood after describing the balance of the mechanism.

The spirals chosen for illustration and shown in the drawings, were arrived at in some such way as follows: The distance C was put at 2.5 inches. The spirals were designed to yield the thirty-six different products obtained by multiplying the digits 1–9, such products ranging from 1 to 81. It seemed desirable for the numeral spiral to have a maximum movement of about three quarters of a turn, and 3⅓° was therefore chosen as the unit of angular movement. It seemed suitable for the log spiral to have a maximum swing of somewhat more than a half turn, and the several logarithmic radiants $r$ were therefore laid off each at an angle of 100° multiplied by log $x$, so that log 81 is represented by an angle of 190.8°, log 2 by an angle of 30.1°, and so on. The factor $a$ therefore became 100 divided by 3⅓=30. Equations 4 and 5 thus became:

$$R=C\frac{30M}{x+30M} \qquad (6)$$

and $$r=C\frac{x}{x+30M} \qquad (7)$$

If we fix C at 2.5 inches, and remember that $M=.4343$, the values of R and $r$ in inches reduce to $$R=\frac{32.5725}{x+13.029}$$

and $$r=\frac{2.5x}{x+13.029}$$

Some change in the cooperating mechanism might make it desirable to change the proportions of the spirals. A pair in which the unit of angle is increased to 4° and log $x$ is multiplied by 160°, may, perhaps, be preferable to the one shown in the drawings. In this instance, $a$=40. The spirals may be varied in other ways.

In each denomination, the spiral pair L, N, is included in a train of gearing shown in Figs. 1, 2, 5 and 9. The numeral spiral N, is part of a rigid structure including also a gear wheel 110 and a spacer 111, the three parts being secured together by rivets 112 and the whole journaled on the shaft 101. Between the gears N and 110, in the space provided by the spacer 111, is a gear 113 journaled on the shaft 102 beside the spiral gear L, to which it is secured into one rigid structure, by rivets 114. Means to actuate this gear 113 and, through it, the entire train, will be described presently.

According to the invention the partial products obtained by these several multiplying gear trains, are added on an accumulator. To this end, the gear 110 drives a pinion 115 which is fast to a larger gear 116, said gears being journaled on a cross shaft 117. An accumulator 120 has its wheels 121 and pinions 122 journaled on a shaft 123 supported by arms 124 fast to a shaft 125, the rocking of which moves the pinions 122 into and out of mesh with the gears 116 in the manner familiar in adding machines. The gearing is preferably so proportioned that turning the gear 110 through a unit angle (3⅓° in the specific instance illustrated) turns gear 116 to the extent of 1 tooth.

Means are provided whereby, when the gearing is operated to register a product, the gear 110 has added to its motion an additional movement equal to one angular unit, in order to compensate for the fact that, when the numeral spiral N is in its initial position, it already stands at 1. To this end, as illustrated and preferably, when after a setting, the parts are restored to normal position, the wheel 110 and the spiral N are not stopped at the initial logarithmic position shown in Fig. 10, but are retracted to the normal zero position shown in Figs. 11 and 1, where the spiral N and wheel 110 stand retracted one angular unit beyond said initial position. The means to this end may be varied in detail. As shown, the member L is provided with an extra tooth 127 (Fig. 11) cooperating with a notch 128 in the end of the member N in such wise that when the gear 113 and member L are turned counter-clockwise a measured distance beyond their logarithmic starting point, the member N is retracted through one unit angle. The tooth 127 and notch 128 are not parts of the spiral gearing, but constitute an additional bit of ordinary spur gearing, entirely independent of the logarithmic spirals. In Fig. 11, the pitch lines 129 and 130 of the gears L and N, respectively, are drawn in, and it will be noted that they are spirals down to the last logarithmic teeth, and concentric from there on. In fact, it will be observed in Fig. 11 that when the parts are in the normal position in question, the teeth 103 of the logarithmic series, have moved out of mesh with one another; but the two parts L and N are still geared together, and when they are turned to set up a number, the logarithmic teeth will roll into mesh properly. The additional movement of the spiral L and gear 113 to accomplish this normal positioning of the parts, is not a logarithmic movement but is an empirical one amounting, the tooth 127 and notch 128 being what they are, to whatever movement is necessary to turn the spiral N back one unit angle. Thus, when, starting at normal position, we set up the number $m$, these parts will be turned through an angle equal to the said empirical angle plus $a$.log $m$; and the spiral N and the gear 110 will be turned through an angle $m$. Whether the accumulator 120 be thrown into mesh with its actuator 116 on the advance or on the return stroke, the pinion 123 will be turned $m$ teeth in one direction or the other.

Figures 7, 8, 9:
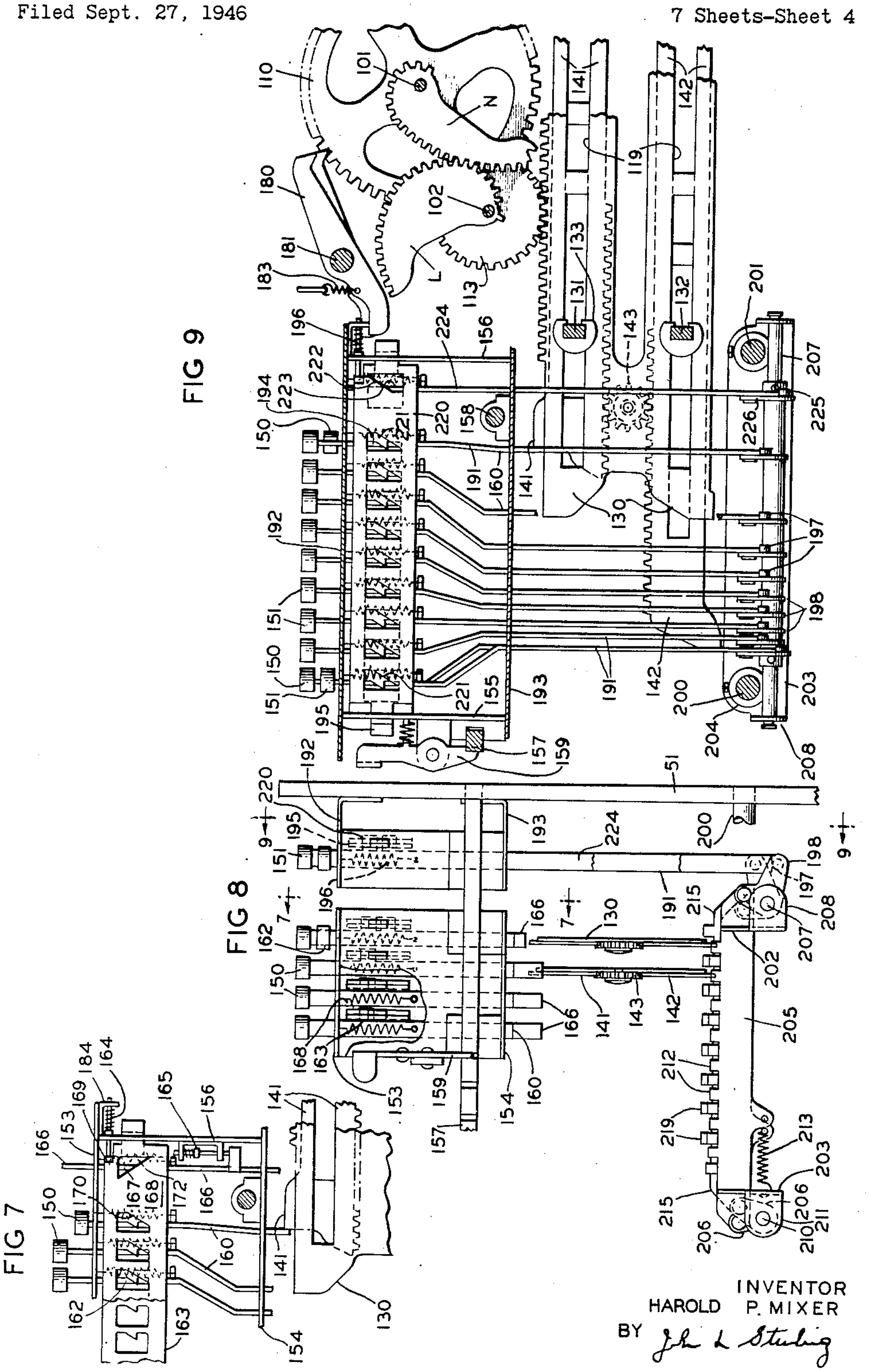
Figs. 7, 8 and 9 are fragmentary elevations of the key boards and their cooperating mechanism, the parts being shown in the act of multiplying 1 by 9.

The means to control and to actuate the above described trains to multiply numbers, in other words, in the illustrated instance, to actuate and control the gear 113, may be varied considerably. An improved means to actuate said gear 113, is shown in the drawings. Said gear is in constant mesh with a rack bar 130 slidably mounted on upper cross frame bars 131 and lower bars 132, passing through slots 119 in said rack bar. Springs 135 urge said rack bars toward the front of the machine for their advance strokes. Each of these frames actuates the whole train of gearing 119, 113, L, N, 110, 116, and may obviously act primarily on any member of said train. As illustrated, they are attached to a cross bar 136 and act to draw the racks 130 toward the front of the machine. They are retracted to normal position by a restoring bar 137 playing in a slot 138 in each of said rack bars and reciprocated from a drive shaft 140 in the base of the machine, as will be described hereinafter. A multiplicand slide bar 141 is mounted on the upper guide bars 131 beside the rack bar 130, and a multiplier slide bar 142 is similarly mounted on the lower guide bars 132. Clips 133 sprung into shallow slots in the bars 131 and 132, guide the rack bars 130 and 141 on cross bars 131 and 130 and 142 on bars 132 (Fig. 3). The bar 141 has rack teeth on its lower edge and the bar 142 on its upper edge, the two racks meshing with a pinion 143 journaled on a stud 145 riveted to the bar 130. The whole amounts to differential gearing such that if either bar 141 or 142 slides leftward in Fig. 1, the bar 130 will slide in the same direction through one-half the distance; and if both bars 141 and 142 be set differential distances leftward of normal, the bar 130 will be advanced a distance equal to one-half of the sum of the distances advanced by the two bars 141 and 142, as shown in Fig. 9. In operation, the gear 113 is advanced (turned clockwise) through measured differential angles appropriate to the logarithms of the several products ranging from 1 to 81, and the bar 130 is advanced the same linear distances as measured on the pitch line of said gear; and, obviously, such logarithmic distances as applied to the bars 141 and 142 are measured on a scale twice that applied to bar 130.

As far as the mechanism above described is concerned, any suitable means may be employed to control the differential settings of the bars 141 and 142. In the present instance they are controlled respectively by a set of multiplicand keys 150, and a row of nine multiplier keys 151. For simplicity, the key-boards are shown in more or less conventional form. The accumulator 120 may have a step-by-step travel rightward after multiplying by each digit of the multiplier, as is common in calculating machines; but I have preferred instead to provide a full set of multiplying trains, one for each denomination of the product, and to make the multiplicand key-board travel across them. In order to illustrate the invention as simply as possible, I have shown only eight places in the multiplying mechanism, and four rows of multiplicand keys 150.

The multiplicand keys 150 are mounted in a carriage comprising a top plate 153, a bottom plate 154, a front plate 155 and a rear plate 156, the whole slidable on cross frame bars or rods 157 and 158. The key stems 160 are slidably mounted in slots in the plates 153 and 154, being fanned in as shown to bring their lower ends to distances apart, proportional to the logarithms of the digits, said lower ends, when the keys are depressed, serving as stops for the bars 141. The keys have restoring springs 161, and each of them has a lug 162 projecting through a conventional toothed locking slide 163 (Fig. 7) mounted in the plates 155 and 156, and each urged frontward by a spring-pressed pin 164. When any key is depressed it will be locked down by a tooth of the slide 163, and will be released when another key is depressed in the same row, in the manner well known; or all of the keys may be released by pushing in the forwardly projecting ends of the slides 163.

In order to retain the main rack bar 130 in its normal zero position unless one of the keys 150 controlling its denomination at the moment, is depressed, the following means are provided. The front end of said rack 130 is made a little lower than the end of the bar 141, and a stop bar or lock 166, slidably mounted in the plates 153 and 154, stands normally in the path of the rack bar 130, being urged downward by a spring pressed pin 165 bearing on an ear of said stop bar. A slide bar 168, mounted beside the locking bar 163 and standing in front of it as viewed in Fig. 1, has windows into which project the lugs 162 on the key stems, but the lower right hand slope of each such window is continued into an incline 170, so that, when a key is depressed the bar 168 is moved and retained rearward (Fig. 7). The slide 166 has at its upper rear corner a cutout 169 to prevent said slide from being affected by the spring pressed pin 164. The stop bar 166 has a lug 167 projecting into a window of said slide 168 and cooperating with an incline 172, so that when a key is depressed said locking slide 166 is pulled upward and no longer obstructs the motion of the rack bar 130. If, for example, the multiplicand was 307, depression of the 3 and the 7 keys would free the racks 130 in the hundreds and units places, as far as the multiplicand is concerned, but those in the thousands and tens places would remain locked in normal position.

The key-board carriage may be fed leftward by any suitable means, but, for simplicity, no such means is shown herein, the carriage being moved by hand. In order to locate the carriage in any of its four positions, any suitable latch may be provided, such as a pivoted thumb-operated member 159 (Figs. 8 and 9) pivoted to an ear of the front plate 155 and spring pressed into one of the notches 169 in the bar 157. The key-board carriage is moved at a time when all of the differential bars 130, 141 and 142, are held in their extreme retracted positions by the restoring bar 137.

Figure 4:
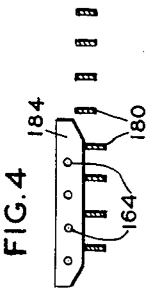
Fig. 4 is a detail in section on the line 4—4 of Fig. 1 and looking in the direction of the arrow.

Means are provided to hold inactive all multiplying trains except whatever four of them are at the time under control of the multiplicand key-board. This may be done in a variety of ways. As shown (Figs. 1, 4 and 5), a series of pawls 180, one for each train, are pivoted on a cross shaft 181, and urged each by a spring 183 into locking engagement with the large gear 110 of its associate train. The heels of said pawls project forwardly, and, as the carriage is moved back or forth, a flange 184 on the rear edge of its upper frame plate moves over them and, by its inclined ends, cams said heels downward and releases the four pawls immediately behind said carriage. The pawls not so released prevent their associated multiplying trains from operating.

The multiplier key-board consists of the row of multiplier keys 151 and their appurtenances. The stems 191 of said keys are guided in upper and lower guide brackets 192 and 193, respectively, said brackets being secured to the right hand frame piece 51 of the machine. The several key stems have lugs 194 projecting therefrom through the usual toothed windows of a conventional locking slide 195, like the slides 163 of the multiplicand key-board. Said stems are provided with any suitable restoring springs. When any key 151 is depressed it is locked down by the slide 195 and releases any previously depressd key. The lower end of each key stem 191, stands above a stud 197, projecting from the horizontal arm of a bell-crank 198, which is an element of the multiplier stop basket now to be described.

Two transverse frame rods 200 and 201, support right and left hand guide bars or brackets 202 and 203, respectively. These are sheet metal bars each having two sleeves or hub-like collars 204 secured thereto, and the frame bars 200 and 201 pass through these sleeves, which are then secured in place by set screws. The bars 202 and 203 constitute guide combs for nine stop bars 205. Each stop bar is supported at its right hand end by one of the ball-cranks 198, and at its left hand end by a link 206. Said bell-cranks are pivoted on a rod 207 supported at its ends by brackets or ears 208 formed off from the ends of the bar 202; and the links 206 are similarly pivoted on a rod 210 carried by ears 211 formed off from the ends of the bar 203. Each stop bar 205 has in its upper edge a series of stop teeth 212 separated by notches, one notch normally standing in line with the end of each of the multiplier rack bars 142. The construction is such that, when the machine is operated, a rack 142 may advance through the notches in unoperated bars 205, and it will be arrested by a tooth of whichever of said bars 205 has been displaced by the depression of its associated key 151, which depression shifts the stop bar slightly to the right, bringing one of its teeth 212 into the path of each of the racks 142. Thus, all of the racks 142 that advance in any one operation, advance to the same extent, appropriate to the logarithm of the multiplier digit. The stop bars 205 have the same logarithmic spacing from one another as the key stops 160 of the multiplicand key-board. It will be perceived that in a multiplying operation, in each denomination, the rack 141 will advance a distance appropriate to the log of the multiplicand digit set up in that denomination, the rack 142 will advance a distance appropriate to the log of the multiplier digit, and the rack 130 will advance and operate the multiplying train to an extent appropriate to the sum of the two logarithms, that is, to the logarithm of the product of the two digits.

In order to lock all of the main rack bars 130 in normal position unless a multiplier key has been depressed, the following means are provided. Behind all of the stop bars 205, there is similarly mounted another stop bar 215 having teeth 219 normally retaining all four of the active rack bars 130 in their zero positions, this bar being in addition to the individual stops 166 of the multiplicand key-board; and this stop bar 215 is moved to release position by the depression of any one of the nine multiplier keys 151. It is like the stop bars 205 except that its upper notched edge stands higher than theirs as shown in the drawings. The lower front corner of the rack bar 130 is higher than that of the multiplier rack 142, so that whereas a tooth of the bar 215 may arrest rack 130, said rack, when it advances frontward, can pass over the top of a tooth of a bar 205 (Figs. 8 and 9).

The locking bar 215 is controlled by the keys 151 by means best shown in Figs. 8 and 9. The lugs 194 on the key stems 191, project through windows in a slide 220, each such window having an inclined edge 221 such that when the key is depressed the slide is forced rearward. Said slide has another window whose upper forward edge 222 is so inclined that, when the slide moves rearward, a lug 223 on a push bar 224 is forced downward. Said push bar at its lower end presses down a stud 225 on a bell-crank 226 to the upstanding arm of which the bar 215 is pivoted. Said bar 215 is mounted at its other end on a link like the links 206. In short, the bar 215 is mounted and operated in the same way as the bars 205. It differs from them in that its upper edge is higher and in that, instead of a notch, a tooth stands normally in the path of each rack 130; and when bar 215 is operated, the notches thereof come in front of said rack bars and free them to advance.

The mode of operation of the racks 130, 141 and 142, is as follows. When a rack 130 is restored to normal position by the bar 137, the rearward movement of the rack 141 is limited by the end of one of its guide slots reaching the cross bar 131; and also, the rack 142 limits in the same way on the bar 132. Each of the three racks is thus at the limit of its rearward movement, and as long as rack 130 is retained either by its upper lock 166 or its lower lock 215, neither of the racks 141 or 142, can advance, because the two racks are connected together by the pinion 143, and said pinion being held against forward movement, neither rack could advance without moving the other rearward. If the 1 key 150 and the 1 key 151 be depressed (1 times 1) and the machine operated, the rack 130 must advance the distance required to move the spirals L and N from their normal zero positions to their initial logarithmic positions, as above described; and this will entail a forward motion of one or the other of the racks 141, 142, or of both of them, the movement of one of said racks, or the sum of the movements of both of them, amounting of course, to double the distance moved by the rack 130. In the design illustrated in the drawing, this is accomplished by making the racks 141 and 142 of such lengths that, in the normal position shown in Fig. 1, the rack 142 stands in its 1 position and the rack 141 at a distance from the 1 stop 160 equal to the said double distance. When multiplying 1 by 1, therefore, the rack 142 is held in its normal position by the 1 stop 205 and the rack 141 advances twice as far as the rack 130. In the drawing, the stop or lock 166 is shown spaced from the 1 stop 160 at this double distance, so that normally the upper front corners of the racks 130 and 141 are in alignment and lock 166 locks the rack 141 also; but this particular disposition of said lock 166 is of no significance, and its purpose is achieved by locking rack 130 alone.

Fig. 9 shows the parts at the end of the forward stroke when multiplying a multiplicand 1 by a multiplier 9. The "1" multiplicand key 150 has been depressed to move its stem 160 into the path of the rack 141 and to raise the lock 166 out of the path of the rack 130. The "9" multiplier key 151 has been depressed to shift its stop bar 205 to arresting position and to shift the locking bar 215 out of position to restrain the rack 130. The bar 141 has advanced from its normal zero position to its "1" position, thus adding 1, and the rack 142 has advanced from its "1" position to its "9" position, thus adding 8 ($x-1$). The gearing stands in its "9" position, and 9 has been added on the accumulator. The rack 130 has advanced beneath and beyond the end of the set "1" key stem of the multiplicand key-board.

Figure 1:
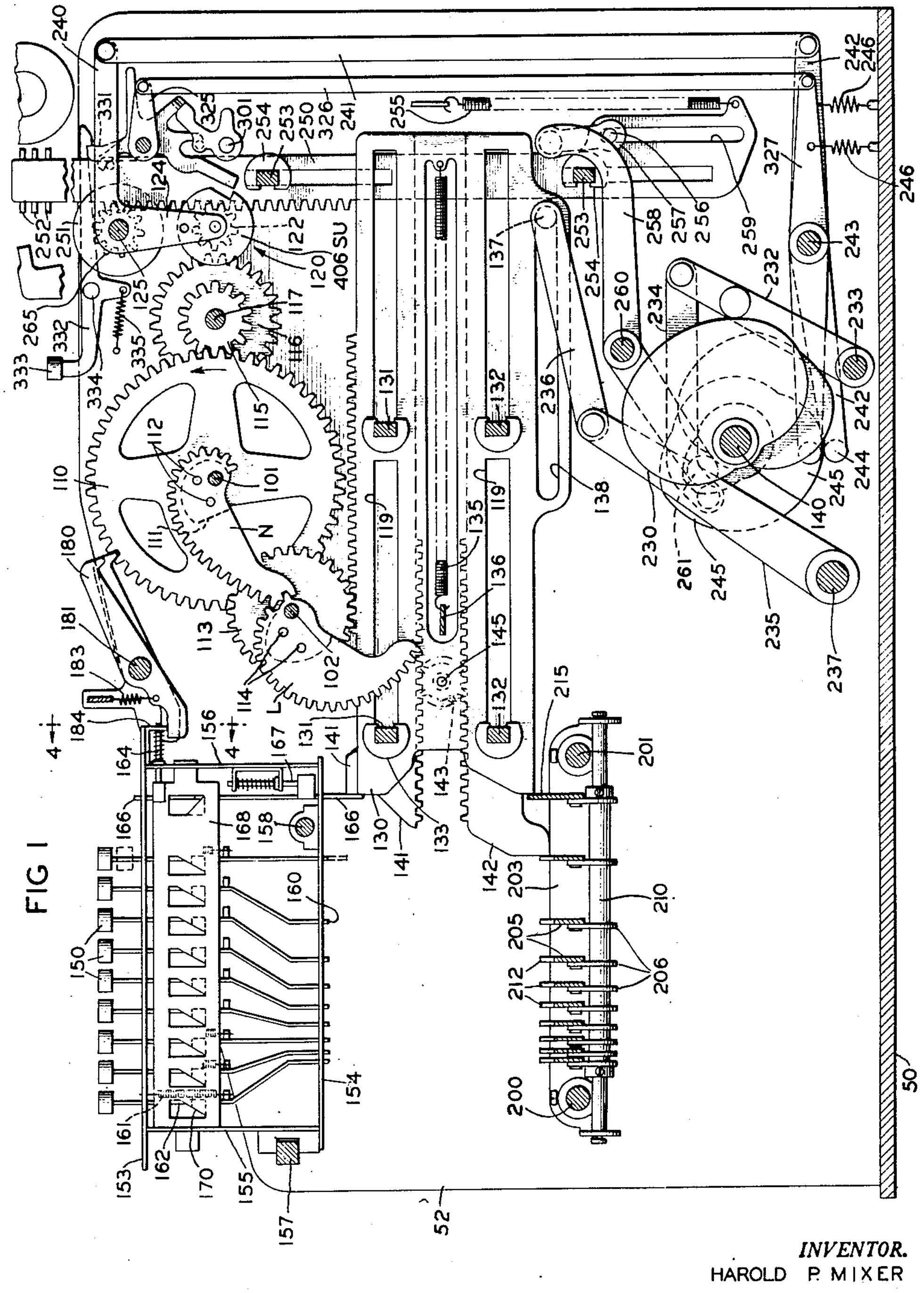
Fig. 1 is a longitudinal vertical section of a machine having the invention embodied therein.
Figures 2, 3:
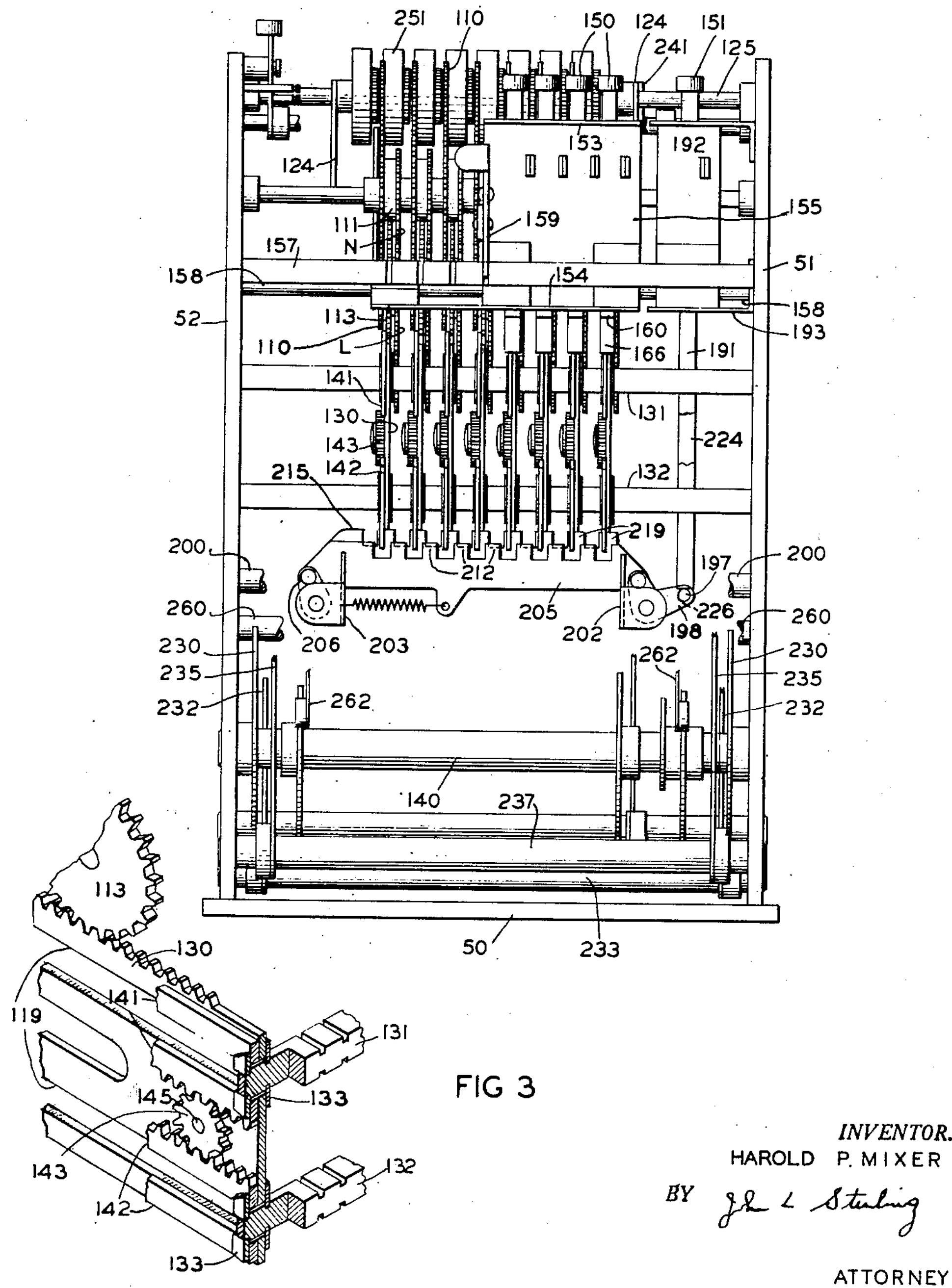
Fig. 2 is a front elevation of the machine.
Fig. 3 is an enlarged, fragmentary view, partly in section, showing certain differential racks and their associate devices.
Figures 13, 14, 15, 16:
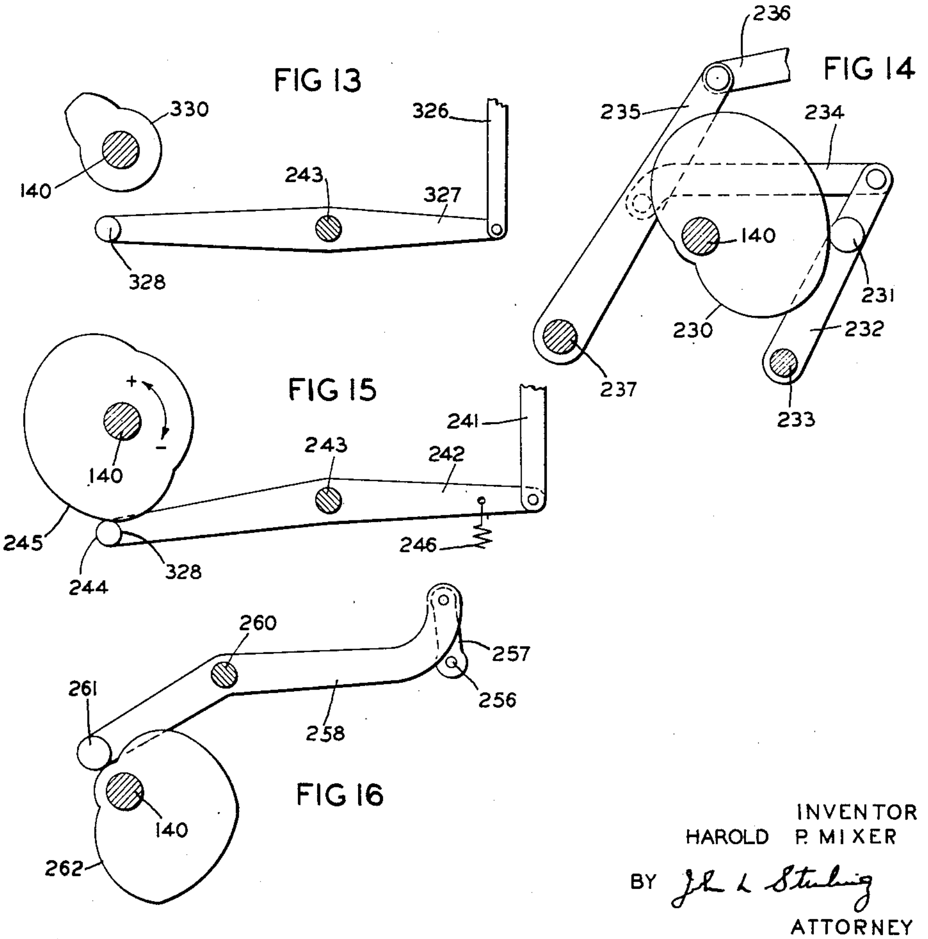

The restoring bar 137 for the main rack bars 130, is reciprocated by two cams 230, mounted on the cam shaft 140, one at each side of the machine (Figs. 1, 2 and 14). Each cam acts on a follower roller 231 on a lever 232, pivoted at 233 and connected by a pull link 234 with a lever or arm 235 which is connected with said restoring bar by a push link 236. The arms 235 may be pivoted on or fast to a cross shaft 237. The timing of this train of restoring mechanism will be described hereinafter, in connection with that of other devices.

The accumulator 120 is thrown into and out of gear with its actuators 116, by the following means (Figs. 1, 2, 5 and 15). As hereinbefore mentioned, it is supported on arms 124 fast on a rock shaft 125. This shaft is rocked by an arm 240 fast thereon and projecting rearward, a vertical link 241, a lever 242 pivoted at 243 and carrying a follower roller 244, resting on a cam 245 on the cam shaft 140. The roller is pressed against the cam by a spring 246, the tendency of which is to move the accumulator into mesh with the the wheels 116. The timing will be explained hereinafter.

Applicant's multiplying mechanism achieves by far its best results if the accumulator is of a type which is capable of continuous operation without any pause for the purpose of effecting the tens carry, such, for example, as an accumulator of the "crawl carry" type, and the one partially illustrated in the drawings is, with a slight exception, substantially the same as that described in the patent to C. Gardner, No. 1,828,180, dated October 20, 1931. As shown in Figs. 17 and 18, in each order there is a drive member consisting of a nine-toothed drive pinion 122 having fast thereto a disk 400 with nine teeth 401 projecting leftward therefrom. In Fig. 18 the disk has been sectioned away and the teeth 401 are shown in section. The drive member 122, 401 is journaled on the concentric part of a sleeve or hub 402 mounted on the shaft 123, and having at its left end an eccentric portion 403 on which is journaled a floating gear 404. Said floating gear has nine radial teeth, each one cut away on its left hand face, so that each tooth has a long part in the same plane as the teeth 401, with which it cooperates as shown in Fig. 18. This cooperation causes the floating gear to turn always through the same angle as the drive member notwithstanding the eccentricity of the floating gear and in whatever position the eccentric 403 may be. The foreshortened left hand portions of the teeth of the floating gear mesh internally with ten teeth 405 projecting rightward from the resultant wheel 406, so that said resultant wheel is geared to the floating gear and, therefore, to the drive pinion 122, in the ratio of nine to ten. The teeth 405 are in the form of cylindrical studs. In the lowest or units order, the hub 402, 403, is fast to a disk 406SU, like the disks of the resultant wheels, but having a single stud 407 projecting through an opening in the arm 124 (Fig. 19) so as to fix the hub against rotation. In each of the other orders, the eccentric is connected with the resultant wheel of next lower order by the sleeve 402 which constitutes the hub of said resultant wheel so that, in each order, the eccentric 403 rotates on the shaft 123 in unison with the resultant wheel of next lower order.

The slight respect in which the illustrated accumulator differs from Gardner's is that, in Gardner, a lug projecting from the periphery of each resultant wheel is used to arrest the wheel at zero, whereas, in the present instance, the disk is enlarged to a radius corresponding to that of said lug, and a notch 408, having one inclined and one abrupt surface, is cut in the disk to serve the same purpose as well as another purpose as will presently appear.

The clearing or zeroizing of the accumulator 120 is not effected by its actuating gears 116 as is common in computing machines, but is done by a separate set of rack bars 250 (Fig. 1), one such bar for each order of the accumulator. These rack bars may also set indicating dials 251, or printing types 252, or both, to indicate the result registered on the accumulator or to record it, as will presently appear. When the operating pinions 122 of the accumulator swing out of mesh with their actuators 116, they swing into mesh with their several racks 250. As the pinions are always in mesh with one or the other of these toothed members, they require no other detents. As shown, the rack bars 250 are guided by frame bars or rods 253 passing through vertical slots in the bars, and spring clips 254 like the clips 133 already described. Each rack is drawn upward by a spring 255, and they are all restored to their normal bottom positions by a restoring bar 256 passing through a slot 259 in each bar. At each of its ends, the bar 256 is connected by a link 257 (Fig. 16) with a lever 258 of the first order, pivoted at 260 and having a follower roller 261 riding on a cam 262 on the cam shaft 140. The restoring bar 256 stands normally in its upper position, shown in Fig. 1, and, as will presently be described, the clearing bars 250 are normally locked down, being released only to take a total. In multiplying operations, the restoring bar 256 may move down and up in the slots 259, but idly.

The indicator dials 251 are journaled on the shaft 125 and each has a pinion 265 constantly meshing with teeth of its associate rack 250. The dials normally show zeros, and when the racks rise under control of the accumulator wheels, these dials indicate the total.

Figure 5:
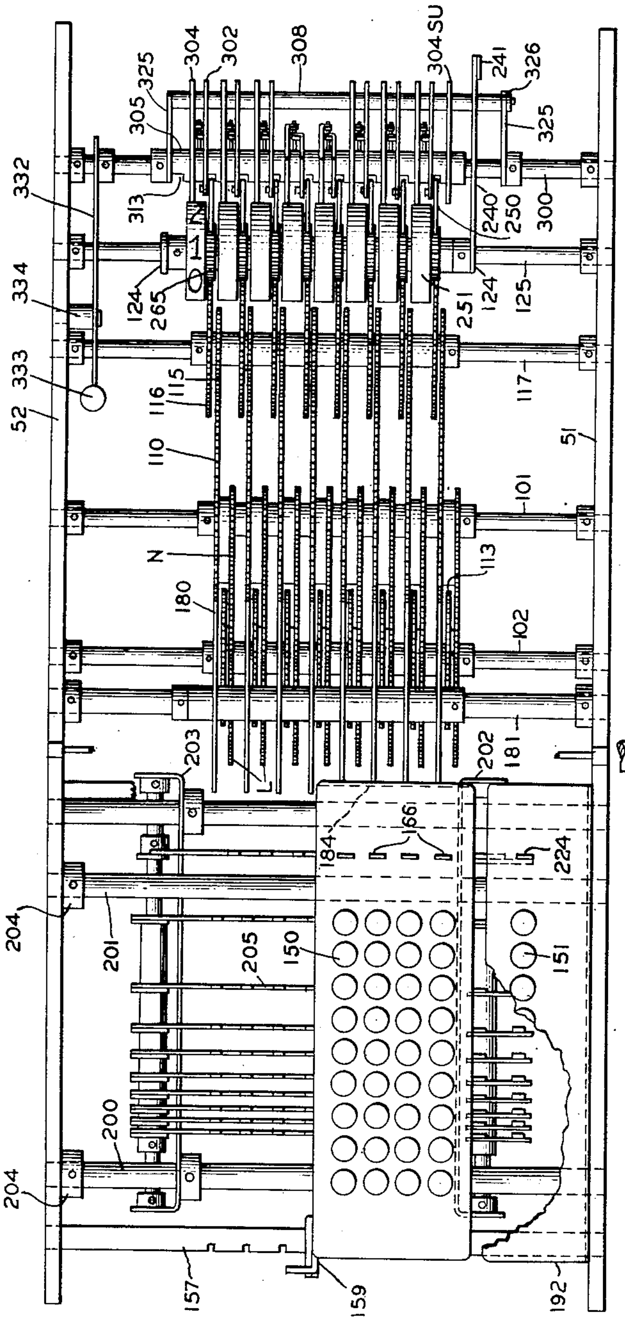
Fig. 5 is a plan view of the machine.

The zeroizing mechanism comprises means cooperating with each rack 250 whereby said rack is normally locked in its down position as shown in Fig. 1, and which, when a total key is depressed has the general mode of operation common with crawl carry accumulators, that is to say, the racks are released one at a time, beginning with the one of lowest order. Two transverse shafts 300 and 301 are arranged just behind the racks 250. As shown in Fig. 5 and, enlarged, in Figs. 6 and 19, there are pivoted on the upper shaft 300 at each denomination, two levers, one, 302 having a hub 303, and another 304 having a hub 305. To avoid crowding, this system of levers is not lettered in detail in Fig. 1, but is shown in Figs. 19, 20 and 21, where some of the parts are designated by their reference numerals with the addition of letters SU, U and T, signifying denominational orders, sub-units, units and tens, respectively. Each lever 302 and 304 has a rear arm drawn downward by a spring 307 and, at the proper time, restored upward by a restoring bar 308. The locking lever 302 has an upper arm with a hook-like end normally engaging a stud 310 on the side of the associate rack bar 250, and locking said bar down. A lower arm of said locking lever has an ear 311 formed off rightward from its end and engaging the end of a blocking member 312, pivoted on the lower shaft 301 and which positively retains said locking lever in locking position. The hub 303 has a cut-out 313 (Fig. 6) to avoid interference with the rack 250 of next higher order.

Figure 6:
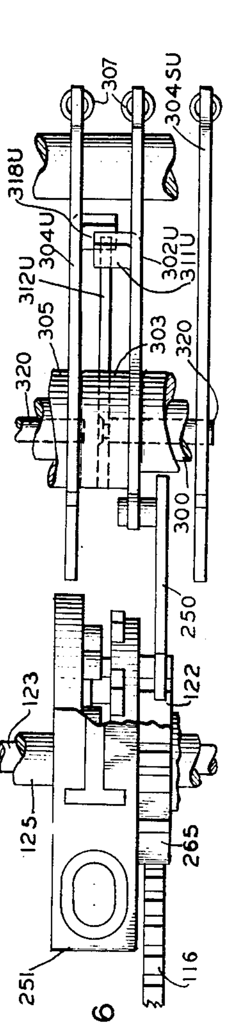
Fig. 6 is a fragmentary enlarged plan view of certain parts employed in total taking.

The lever 304 is herein called the tripping lever for brevity. It performs the dual functions of arresting its own accumulator wheel at zero and of tripping the blocking member 312 to release the levers 302 and 304 of next higher order to the action of their springs 307. Besides its horizontal arm above referred to, it has three arms 314, 315 and 316 (Fig. 21). The arm 316 is adapted, when released, to be pressed by the spring 307 against the cylindrical periphery of the resultant wheel of the accumulator and, as said wheel approaches zero, to slide down the incline of the notch 408 and finally to arrest the wheel. The arm 314 has a lug or ear 318 formed off therefrom and normally resting on the end of the blocking member 312, which holds it just out of contact with said resultant wheel. The arm 315 lies behind a stud 320 on the blocking member 312 which controls the levers 302 and 304 of next higher order, so that, when the arm 316 descends into the notch 408, the arm 315 will swing the blocking member 312 counter-clockwise until the ears 318 and 311 drop off the end of it and free the next pair of levers 304 and 302. Two of these studs 320 are shown in Fig. 6. Thus each pair of locking and tripping levers, and with them their associate rack 250, is released for operation at the instant when the accumulator wheel of next lower order reaches its zero position.

As indicated in Fig. 19, the ear 318 of the tripping lever rests on the end of the blocking member 312 behind the ear 311 of the locking lever, so that, as the arm 316 of the next tripping lever to the right slides down the incline of the notch 408 in the accumulator wheel and the arm 315 of said lever swings the blocking member counter-clockwise, the ear 318 of tripping lever 304 will be released an instant prior to the release of the ear 311 of the locking lever. This is so that, if the accumulator wheel associated with these two levers happens to stand already in its zero position, the arm 316 of the tripping lever will have a moment of time in which to drop immediately into the notch 408 before the release of the locking lever permits the rack to start rising and turning the wheel. This swinging of the tripping lever will, of course, immediately trip the devices of the next succeeding denomination.

Comparing Figs. 19, 20 and 21 with Fig. 6 may clarify the mechanism. Fig. 21 shows the fixed sub-units disk 406SU and the extra tripping lever 304SU, the latter cooperating with the stud 320U on the blocking member 312U. As shown in Fig. 6, this blocking member is behind the units wheel, out of the plane of the lever 304SU, but the stud projects rightward into said plane. There is nothing holding this lever in its normal inactive position, except the restoring bar 308. The arms 314 and 316 are functionless in this one lever, and may be cut off if desired. Fig. 20 shows the locking lever 302U, cooperating with the stud 310U of the units rack. The upper part of said rack is broken away and the stud 310U is shown in section. The ear 311U is standing over the end of the blocking lever 312U and will be held up by it when the restoring bar 308 drops down. In Fig. 19 these same parts are shown in the same way, and, behind the lever 302U is shown the tripping lever 304U, with its ear 318U standing above the blocking lever 312U. The relations of the parts will be apparent in Fig. 6.

The restoring bar 308 is a bail bar mounted on two arms 325 (Figs. 1 and 5) whose hubs are fast on the shaft 300. The right hand one of said arms is connected by a push link 326 with a lever 327 pivoted on the shaft 243 and carrying a follower roller 328 (Fig. 13) adapted to be moved downward by a cam 330 on the cam shaft 140. The rock shaft 300 has fast thereon an arm 331 (Fig. 1) normally engaged by a latch 332 comprising one arm of a total key lever having a total button or key 333 on its front end. Said total key lever is pivoted on a stud 334 and urged to locking position by a spring 335.

The operation is as follows: When the parts are in their normal positions, the restoring bar 308 is up, holding all of the tripping and locking levers 304 and 302 out of action and it is locked in that position by the latch 332; and the cam 330 has its high part out of the path of movement of the roller 328. With the mechanism in this condition and the cam shaft 140 standing still in its normal position, a depression of the total key will result in the restoring bar dropping down (clockwise) and the follower roller 328 moving up into the orbit of the cam 330. When the bar 308 drops, all of the locking levers 302 are retained by the blocking members 312, and so are all of the tripping levers 304 except the sub-units lever 304SU. The latter immediately swings clockwise and acting on the stud 320U, rocks the units blocking member 312U counter-clockwise, releasing the units tripping and locking levers 304U and 302U, thus permitting the units rack to rise, turning the units resultant wheel 406 to zero, if a number stands registered thereon. The tripping lever 304U rests on the periphery of the resultant wheel until the latter approaches zero, when it slides down into the notch 408 which arrests the wheel. The rocking of this lever trips the blocking member 312T, and initiates the zeroizing of the tens wheel; and so on across the series of orders.

It will be noted in Figs. 5 and 19 that the ear 318 of the tripping lever 304, rests on the blocking member 312 behind the ear 311 of the locking lever, so that, when the latter is rocked the tripping lever is released an instant sooner than the locking lever. This is so that, if the resultant wheel is already standing at zero, the arm 318 of the tripping lever will fall immediately into the notch 408 before the locking lever has time to release the rack and start it to rotating the wheel. At the end of the zeroizing operation, the several racks 250 will have risen each as far as permitted by its associated tripping and arresting lever 304, the dials 251 will have been rotated correspondingly to indicate the total visually and the types 252 to print the total will have been aligned before the platen.

The operating mechanism is so contrived that an operation of multiplying a multiplicand set up on the keys 150 by a multiplier digit set up by a key 151, will be executed by one rotation of the cam shaft 140 in either direction from its normal position; and such that when the shaft is turned (by its crank) counter-clockwise, the product is entered in the accumulator 120 additively, whereas, when said shaft is turned clockwise, the product will be entered subtractively.

Figure 12:
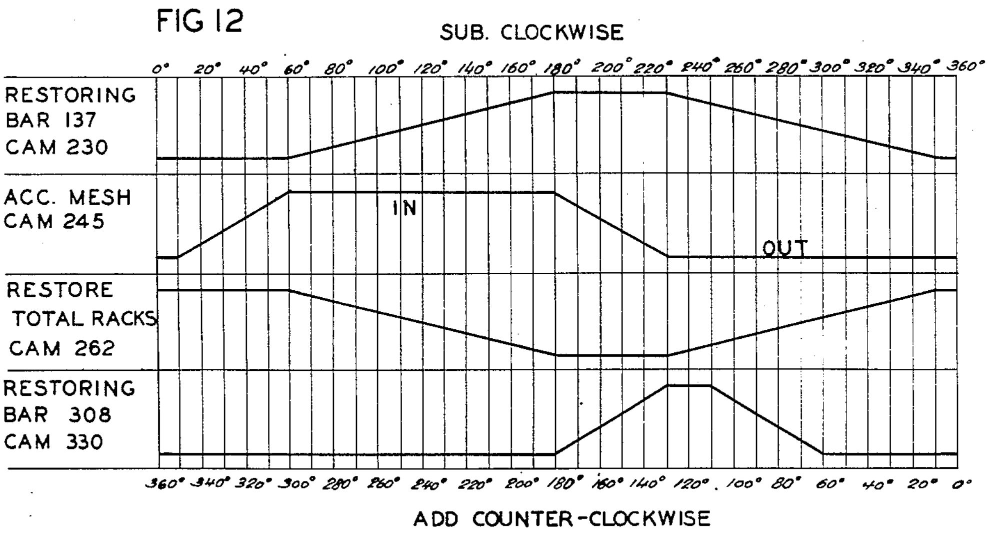
Fig. 12 is a time chart.

In the timing diagram, Fig. 12, the degrees of rotation are designated at the top of the diagram from left to right, for a clockwise rotation, and at the bottom of the diagram from right to left for a counter-clockwise rotation. Comparing the first two lines of the diagram beginning at their right ends, it will be seen that on a counter-clockwise rotation, the accumulator remains in its normal position out of mesh with its actuators 116 from 0° to 130° and that meanwhile, from 10° to 130°, the restoring bar 137, and with it the rack bars 130 and the multiplying trains, have effected their advance movement to where the racks 141 and 142 have been arrested by their respective key stops 160 and 205. From 130° to 180° the restoring bar 137 dwells in its advanced position and the accumulator moves into mesh. From 180° to 300°, the accumulator remains in mesh while the restoring bar 137 restores the multiplying trains thus adding the product on the accumulator, which then moves out of mesh, 300° to 350°.

When the crank is turned clockwise, the diagram, read by its upper degree designation, shows the accumulator first moves into mesh, 10° to 60°, and the restoring bar advances from 60° to 180°, subtracting the product as the racks advance against their stops. The restoring bar dwells in its advanced position while the accumulator moves out of mesh from 180° to 230°, and the multiplying trains are then restored, 230° to 350°.

A complete multiplication of a multiplicand by a plural digit multiplier may be effected by setting the multiplicand key-board in its extreme right hand position, setting up the multiplicand on the keys 150, depressing the key of the units digit of the multiplier, and giving the crank one counter-clockwise rotation; then moving the key-board one space to the left, depressing the multiplier key of the tens digit and again rotating the crank; and so on.

It will be understood, of course, that a number may be added on the accumulator by setting it up on the multiplicand key-board and multiplying it by one. A number of eight digits may be added in two operations, adding the four highest places with the key-board in its extreme left hand positions and the four lowest digits with said key-board in its extreme right hand position.

To take a total, the total key 333 is depressed while the cam shaft 140 is at rest in its normal position. This frees the shaft 300 and restoring bail 308 from restraint by the hook or latch 332, and allows the rack bars 250 to rise, each until arrested when its associate accumulator wheel reaches zero, all as hereinbefore described. After transcribing the total from the dials 251, or printing it by the types 252, the parts may be restored to normal by a counter-clockwise rotation of the cam shaft 140. As shown on the last three lines of the time chart (Fig. 12) from 10° to 60°, the accumulator moves out of mesh with the total racks 250 and into mesh with the actuators 116, where they remain until 180°. The racks 250 are restored during this interval, 60° to 180°, the restoring bar 256 then resting in its advanced (lowermost) position until 230°. At from 180° to 230°, the cam 330 raises the pawl-restoring bail 308, rocking the shaft 300 counter-clockwise until it is locked in that position by the latch 332, thus locking down all of the racks 250 in the manner hereinbefore described. At from 250° to 300°, the high part of the cam 330 moves away from the follower 328, leaving the bail 308 free to drop again when the total key is again depressed. From 230° to 310°, the restoring bar 256 moves to its normal upper position, leaving the racks 250 free to rise when the total key is depressed.

Various changes, besides those hereinbefore mentioned, may be made in the details of construction and arrangement, without departing from the invention.

What I claim as new, and desire to secure by Letters Patent is:

1. The combination of a pair of logarithmic gears consisting of a logarithm member and a numeral member interconnected by spirally disposed gear teeth over a range of movement from a position wherein the numeral member stands at one and the logarithm member stands at zero to a position in which the numeral member stands at $n$ and the logarithm member stands at log $n$, and an additional coupling between the two members effective to permit a supplemental movement of the numeral member from its one position to its zero position; and an accumulator wheel geared to and operated by said numeral member.

2. In a multiplying train, the combination of a logarithm member one portion of which is a logarithmic spiral gear and another portion of which is a spur gear, and a cooperating numeral member one portion of which is a spiral gear cooperating with the said logarithmic spiral and another portion of which is a spur gear cooperating with the first said spur gear, said spiral gears meshing through a range of 81 to 1 on said numeral gear and said spur gears meshing through a range of 1 to 0 on said numeral gear.

3. In a multiplying train, the combination of a logarithm member one portion of which is a logarithmic spiral gear and another portion of which is a spur gear, a cooperating numeral member one portion of which is a spiral gear cooperating with the said logarithm spiral and another portion of which is a spur gear cooperating with the first said spur gear, said logarithm and numeral members normally standing with said spur gears in mesh; means to impart to said numeral member a movement from zero to one and to said logarithm member an empirical movement to zero while said spur gears are in mesh, and, while said spiral gears are in mesh, to impart to said numeral gear movements from 1 to 81 and to said logarithm gear movements through distances appropriate to the logarithms of 1 to 81, and means to limit the movement of said logarithm gear in accordance with the sum of the logarithms of two factors plus said empirical movement.

4. In a machine for multiplying numbers, the combination of an actuating rack, a multiplicand rack, a multiplier rack, differential gearing connecting said multiplicand and multiplier racks with said actuating rack, a logarithmic spiral pair actuated by said actuator rack including a numeral spiral and a logarithm spiral, means to determine advance movements of said multiplicand rack to positions appropriate to the logarithms of multiplicand digits, means to control advance movements of said multiplier rack to positions appropriate to the logarithms of multiplier digits, and means to restore said actuating rack to a normal position beyond its log 1 position to bring said numeral spiral to zero position.

5. In a computing machine the combination of a spiral pair comprising a logarithm spiral rotatable from initial position through angles $y$ appropriate to the logarithms of numbers $x$ ranging from one to eighty one and a numeral spiral rotatable uniform distances according to said numbers $x$ from position one to position eighty one, all according to the formula $$y=a.\log x$$

and differential mechanism comprising a member to operate said logarithm spiral, a member operable through distances proportional to the logarithms of multiplicand digits, a member operable through distances proportional to multiplier digits, and a differential gear connecting the three said members to control the movements of said operating member in accordance with the sum of the movements of the other two said members.

6. The combination with a logarithmic pair comprising a logarithm spiral and a numeral spiral, of a main rack geared to said logarithm spiral, a multiplicand rack and a multiplier rack connected with one another and with said main rack by a differential gear, means settable to determine a movement of said multiplicand rack, means settable to determine a movement of said multiplier rack, means to lock said main rack in normal position, and means controlled by the combined action of the two said settable means to release said locking means.

7. In a computing machine, the combination of a logarithmic spiral pair comprising a logarithm spiral and a numeral spiral, a rack geared to operate said logarithm spiral, a multiplicand rack, a multiplier rack, a differential gear connecting said multiplicand and multiplier racks with said operating rack, in-put means settable to control movements of said multiplicand rack in proportion to the logarithms of multiplicand digits, input means settable to control movements of said multiplier rack in proportion to the logarithms of multiplier digits, and locking means for said operating rack released by the setting of both said in-put means.

8. In a calculating machine, the combination of a series of denominational logarithmic multiplying trains each comprising a logarithm member and a numeral member, a rack to operate said logarithm member, a multiplicand rack, means to hold said operating rack in a zero position where said rack is retracted beyond its initial logarithmic position, multiplicand digit stops, means to set said stops selectively and, concomitantly, to release said holding means, a multiplier rack, differential gearing connecting said multiplier and said multiplicand racks jointly to control said operating rack, multiplier stops common to a succession of said multiplier racks, a common means to restrain all of a succession of said operating racks in their said zero positions, and means to set said multiplier stops selectively and concomitantly to release said common restraining means.

9. In a machine for multiplying numbers, the combination of a series of denominational logarithmic gear pairs each including a logarithm spiral and a numeral spiral intermeshing over a range of movement from 1 to 81, an accumulator having denominational wheels, and gearing connecting each said numeral spiral with the appropriate accumulator wheel to convey to said accumulator wheels the movements of said numeral spirals, and means to add 1 at each actuation of a logarithmic pair.

10. In a computing machine, the combination of a series of denominational logarithmic gear pairs each including a logarithm spiral and a numeral spiral intermeshing over a range of movement from 1 to 81, means including a differential mechanism to set each said logarithm spiral in proportion to the sum of two logarithms in one stroke, an accumulator having denominational wheels, and gearing connecting each of the said numeral spirals with the appropriate accumulator wheel to convey to said accumulator wheels the movements of said numeral spirals, and means to add 1 at each actuation of a logarithmic pair.

HAROLD P. MIXER.

REFERENCES CITED

The following references are of record in the file of this patent:

UNITED STATES PATENTS

| Number | Name | Date |
|---|---|---|
| 179,737 | Smith | July 11, 1876 |
| 1,028,135 | Rein | June 4, 1912 |
| 1,221,027 | Cluley | Apr. 3, 1917 |
| 1,332,543 | Cluley | Mar. 2, 1920 |
| 1,482,153 | Ross | Jan. 29, 1924 |
| 1,503,810 | Ross | Aug. 5, 1924 |
| 1,867,002 | Gardner | July 12, 1932 |
| 1,889,876 | Pellerin et al. | Dec. 6, 1932 |
| 2,261,341 | Crosman | Nov. 4, 1941 |
| 2,342,529 | Chase | Feb. 22, 1944 |

FOREIGN PATENTS

| Number | Country | Date |
|---|---|---|
| 334,733 | Italy | Jan. 29, 1936 |
| 340,013 | Great Britain | Dec. 12, 1930 |
| 445,787 | Great Britain | Apr. 20, 1936 |